W. Smith.
Weaving.
No. 3014 Reissued Jun. 30, 1868.
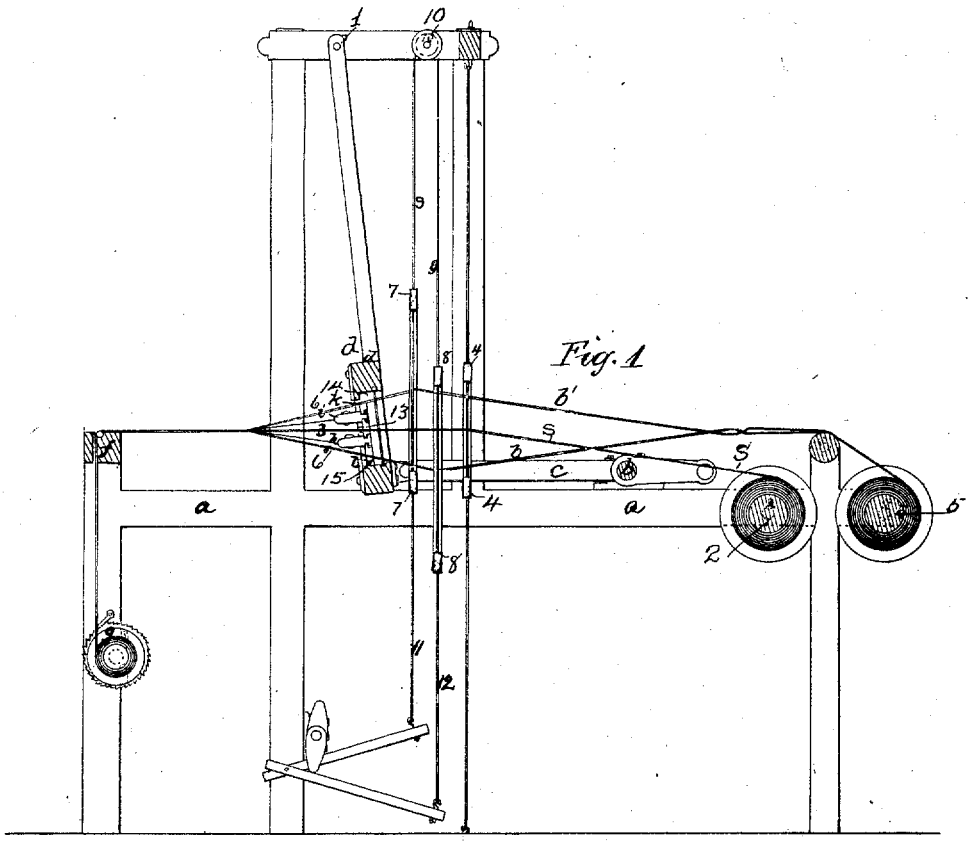
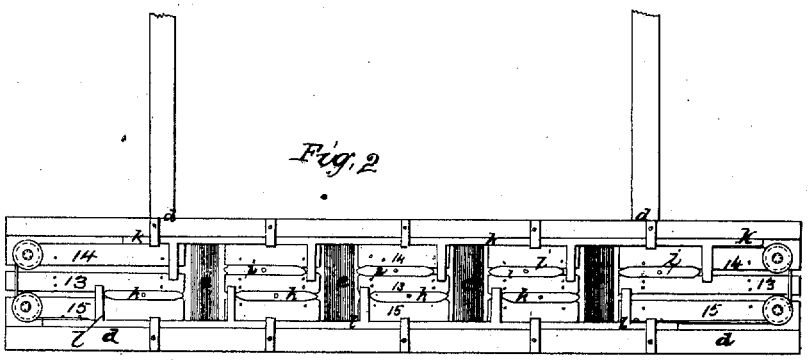
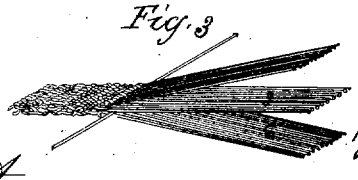
Witnesses
Samuel W. Sewell
Chas Tenullert
Inventor
Wm. Smith

UNITED STATES PATENT OFFICE.

WILLIAM SMITH, OF NEW YORK, N. Y.

IMPROVEMENT IN CORDED ELASTIC FABRICS.

Specification forming part of Letters Patent No. 9,653, dated April 5, 1853; extended seven years; Reissue No. 2,656, dated June 18, 1867; Reissue No. 3,014, dated June 30, 1868.

DIVISION B.

*To all whom it may concern:*

Be it known, that I, WILLIAM SMITH, of the city, county, and State of New York, weaver, have invented, made, and applied to use a certain new and useful Improvement in Woven Fabrics; and I do hereby declare that the following is a full, clear, and exact description of the same, reference being had to the annexed drawings, making part of this specification, wherein—

Figure 1 is a sectional elevation of the loom employed by me. Fig. 2 is a front view of the lay. Fig. 3 is a perspective view illustrating the mode of weaving the said improved fabric.

The like marks designate the same parts.

The object of this invention is to produce a fabric that has a center warp inclosed above and below by weft-threads held in place by interlaced warps.

The nature of this division of my said invention consists in an improvement in the woven fabric itself possessing that character. I will, however, proceed to describe the loom employed, and then point out the features which distinguish my said fabric from others before made.

*a* is the frame of the loom, of any convenient form, carrying the driving-shaft *b*, that is moved by any competent power.

*c* are the connecting-rods from cranks on the shaft *b* to the lay *d*, that is supported by and vibrates on a rock-shaft, 1.

2 is a warp-roller, or its equivalent, kept from turning freely by the friction of a strap, or any usual means, so that the warp 3 is given off when at the required tension, as now practiced. The warp 3 is to be of india-rubber strips, if the fabric is to be corrugated and elastic; or this warp may be cotton or any fibrous substance where a thick quality of goods is required. This warp passes through the stationary heddle 4 and through the reeds *e* in the lay over the breast-beam *f*, the fabric as it is formed being wound by any usual means on the roller *g*.

5 is the warp-roller, supplying the warp 6 for the sheds. The warp passes through heddles 7 and 8 and through the reeds *e*, forming the fabric with the warp 3 and filling, as hereinafter shown. The heddles 7 and 8 are worked by any competent means, the one being fitted to ascend as the other descends. In the drawings these are shown as connected by straps 9 over a pulley, 10, the straps 11 and 12 being connected from the under side to treadles, to be worked by cams from an auxiliary shaft or by the feet in the usual manner when power is not used.

The lay itself in front of the reeds *e* is shown as formed to receive two shuttles, having a center piece, 13, with a rib on each edge, an upper piece, 14, and a lower piece, 15, all attached to the body of the lay, so as to receive and sustain the shuttles *h* and *i* by the ribs taking grooves in the top and bottom of the back edge of the shuttle; and, the length of the shuttle being greater than the width of the reeds, one end enters the groove before the opposite end is disengaged. The shuttles are propelled by means of a frame, *k*, with projections depending from the same to give the blow and propulsion to the upper shuttle, and the lower shuttle is moved by a similar frame, *l*, and projections. Fig. 1 shows a means by which these frames may be moved, the ends of the top and bottom parts being connected by straps over pulleys, so that one travels one way, while the other travels in the opposite direction, and by an ordinary picking motion, if in a power-loom, or the usual strap for a hand-loom, applied to move either frame, the shuttles are thrown in opposite directions through the sheds above and below the warp 3. This loom is especially intended for use in weaving corrugated elastic fabrics, several pieces being woven at the same time.

Instead of the frames *k* and *l*, racks may be used, that in their motion rotate pinion-wheels fixed on the lay, that take a rack in the side of each shuttle; one pinion taking hold of one end of the shuttle before it clears the other pinion, thus drawing the shuttle through the shed even if the motion be not sudden enough to throw the shuttle; or both shuttles may be thrown through the sheds in the same direction at the same time.

The weft passes across above and below the center warps, 3, (see Fig. 3,) and the interlocking of the moving warps 6 with such weft presses said weft upon the center warps. In weaving india-rubber elastic goods my loom and mode of weaving are especially useful, and have advantages over other looms for the following reasons, which reasons apply to a certain extent to the weaving of other fabrics than india-rubber.

When a warp of india-rubber has been inclosed in a woven fabric, it has been done by one shuttle passing over and depositing its filling, the rubber then being raised and the shuttle passing beneath it, the warps and filling interlocking and forming two complete fabrics—one above and the other below the rubber cords—which fabrics are tied together by binding-warps that interlock between the rubber cords, thus inclosing them in a woven pocket. In this mode of weaving, the fabric has ribs produced on its surface, caused by the india-rubber, in raising or lowering, embedding itself, leaving the india-rubber thread loose within the woven covering, which is raised on each side; but by my arrangement, the india-rubber being stationary, but a slight rib is formed on the surface of the goods, and the rubber is compressed by the wefts, and is not liable to draw into the fabric at its ends when said fabric is cut crosswise of the rubber.

I am aware that prior to my said invention corded fabrics were produced. In some instances—as in Windsor carpets—the cords were introduced as an upper weft on the upper surface of a complete woven cloth as a foundation, the figuring-warps passing from the foundation cloth over each cord and back to the foundation-cloth. In other instances the cords constituted part of the weft with thread-wefts interposed, such cords being interwoven with the warp in like manner as the interposed weft-threads, each warp-thread passing under some of the cords and over others, and one warp-thread passing over and the next one under any one of the cord-wefts, and so on across the entire width of the fabric. In others the cords were introduced as part of the warp and with warp-threads interposed; but in such case the cords were interwoven with the weft-threads just as the interposed warp-threads—that is to say, each weft-thread passed over some of the cords and under others—so that the pull on the weft-threads would tend to crinkle the cords, and in the woven fabric the only thing which prevented the cords from being crinkled as warp-threads are crinkled in ordinary fabrics was the greater rigidity of the cords. In other cases—as in the border of handkerchiefs—cords were introduced at given distances apart, both as warp and as weft; but both being woven in as ordinary warp and weft, as above stated, the crinkling of both sets of cords by the interweaving being prevented only by the fact that the cords were more rigid than the other warp and weft threads. And in other cases the longitudinal cords were separated and enveloped by the intervening of the warp-threads and weft-threads between and around the cords in alternate strips of single and of double cloth—as a single cloth between the cords and as double cloth, to form what may be termed "tubes" surrounding the cords; and, although there was no tendency in this to crinkle the cords, it was defective for many purposes, because, the warp-threads and weft-threads being interwoven into cloth both above and below the cords, there was nothing to prevent the cords from being pulled or working out the tubes.

The features which distinguish my improved corded fabric from all others before known are as follows, viz: The cords are longitudinal, and may be termed "cord-warps." They are separated from each other by the interweaving of the warp-threads and weft-threads in strips of cloth between the cords only, and not over and under the cords, and the cords are covered on both surfaces by weft-threads only. The weft-threads are not interwoven with the cords, as in the case of corded handkerchiefs, tending to crinkle them, as above stated, but each weft-thread passes either over or under all the cords, instead of passing first under one cord and then over the other, and so on across the fabric, and it is interwoven only between the cords and only so interwoven with the warp-threads. The fabric being so constituted at every part of the length, the cords are gripped between two weft-threads—one above and the other below—which two weft-threads are drawn each half-way around each one of all the cords by being interwoven with the warp-threads in the several spaces between the cords. In this way the cords are firmly held in the fabric, so that they cannot work out, nor can they be pulled out, while at the same time the binding force by which the weft-threads grip and hold the cords does not tend to crinkle them.

I am aware that in an old French work on the weaving of silk goods, which was printed in 1778, a fabric is described in which certain tie-threads are interwoven in some parts of the fabric in substantially the same way that my elastic cords are interwoven; but nothing of the kind now contemplated by me was then attempted or accomplished. Protesting, therefore, that this is not a reference sufficient to prevent me from obtaining the patent now sought, but unwilling to consume more time at present in controverting the point made thereon by the Patent Office, I hereby disclaim the purpose of including all kinds of weaving of the kinds hereinbefore described, but limit myself to such fabrics where the cords are elastic.

What, therefore, I claim as my invention, in this subdivision of my patent, is—

The corded fabric, substantially as hereinbefore described, in which the cords are elastic and are held between the upper and under weft-threads and separated from each other by the interweaving of the upper and under weft-threads with the warp threads in the spaces between the cords and only there, substantially as above shown.

In witness whereof I have hereunto set my signature this 7th day of September, A. D. 1867.

WM. SMITH.

Witnesses:
CHAS. H. SMITH,
GEO. T. PINCKNEY.